United States Patent
Norman et al.

[11] Patent Number: 5,892,348
[45] Date of Patent: Apr. 6, 1999

[54] MATRIX INTERPOLATION

[75] Inventors: Rosemary Anne Norman; David Mark Sugden, both of Leeds, England

[73] Assignee: Switched Reluctance Drives Limited, Harrogate, England

[21] Appl. No.: 882,860

[22] Filed: Jun. 26, 1997

[30] Foreign Application Priority Data

Jun. 27, 1996 [GB] United Kingdom .................. 9613538

[51] Int. Cl.$^6$ ...................................... H02P 1/46
[52] U.S. Cl. .................... 318/701; 395/421.09; 395/800; 364/931; 364/764
[58] Field of Search ...................... 318/701; 395/421.09, 395/800; 364/931, 764

[56] References Cited

U.S. PATENT DOCUMENTS

| 5,442,581 | 8/1995 | Poland ................................. 364/764 X |
| 5,461,295 | 10/1995 | Horst . |
| 5,530,890 | 6/1996 | Moore et al. ........................... 395/800 |
| 5,604,915 | 2/1997 | Moore et al. ......................... 395/800 X |

FOREIGN PATENT DOCUMENTS

| 0 534 761 A1 | 3/1993 | European Pat. Off. . |
| 0 630 097 A2 | 12/1994 | European Pat. Off. . |
| 0 630 097 A3 | 12/1994 | European Pat. Off. . |
| 0 710 599 A1 | 5/1996 | European Pat. Off. . |
| WO 91/01527 | 2/1991 | WIPO . |

OTHER PUBLICATIONS

"The Characteristics, Design and Applications of Switched Reluctance Motors and Drives", by Stephenson and Blake, presented at the PCIM '93 Conference and Exhibition at Nurnberg, Germany, Jun. 21–24, 1993.

*Primary Examiner*—Karen Masih
*Attorney, Agent, or Firm*—Patterson & Keough, P.A.

[57] ABSTRACT

A method of memory matrix interpolation in an ASIC processor requires a reduced amount of program code and memory space in the interpolation routine by shifting values in the interpolation routine between shift registers and overwriting redundant data in the shift registers with intermediate results. A switched reluctance drive system incorporating such a method provides similar advantages.

16 Claims, 9 Drawing Sheets

MATRIX INTERPOLATION

BACKGROUND OF THE INVENTION

1. Field of the Invention

This invention relates to a method of interpolation in a matrix. The invention is particularly, though not exclusively, concerned with interpolating between stored values in a memory matrix, for example, for a controller for an electrical machine.

2. Description of Related Art

A reluctance machine is a form of electrical machine, consisting of two main parts: the stator, which has salient poles with coils around them which typically carry unidirectional current; and the rotor, which has salient poles but no windings or permanent magnets.

The combined control and power switching electronics, and the reluctance machine are commonly referred to as a switched reluctance (SR) drive system. The power electronics typically consist of two switches and two diodes per phase supplied from a DC source or a rectified AC supply. The switching of these devices has to be synchronized to the position of the rotor for the machine to operate correctly. To achieve this, a position sensor, usually having a moving part mounted on the rotor shaft of the SR machine, is used to generate an angular rotor position signal which is fed back to the control electronics to produce the firing signals for the power devices. A more detailed description of the switched reluctance machine and its control and power electronics can be found in "The Characteristics, Design and Applications of Switched Reluctance Motors and Drives" by Stephenson and Blake, presented at the PCIM '93 Conference and Exhibition at Nurnberg, Germany, Jun. 21–24, 1993, which is incorporated herein by reference.

Increasingly, in low-cost, high-volume applications, the control electronics are based around an application specific integrated circuit (ASIC) which has a microprocessor embedded in it.

The control law according to which the SR machine is operated will interpret a specific torque demand on the machine to maintain the required machine output. Typically, the controller inputs are the torque demand, or possibly a speed demand in a closed-loop speed control system, and the actual machine speed derived from the rotor position signal. In response, the controller provides one of a selection of control parameters as outputs for controlling the machine. The outputs are commonly an ON command, an OFF command, a freewheel (FW) command and a CHOP command. While it is possible, in some applications, to program the controller with the control law in order to compute the appropriate output for a given input in real-time, a controller will often employ a look-up table of set outputs for given inputs instead. One form of look-up table comprises a matrix of coordinates in which the inputs of torque and speed are used as row and column addresses for accessing an array of stored parameter values. In order to minimize the amount of space given over to the matrix, a sparse matrix is sometimes used in which less than a complete set of outputs is available for a given set of inputs, i.e. there are more discrete combinations of inputs than address locations. In this circumstance it is necessary to interpolate between the stored parameter values to achieve smooth control. A sparse matrix may be arranged either as a regularly spaced set of parameter values or as an irregularly spaced set of parameter values which are clustered around the values of the more common operating conditions.

As opposed to determining a parameter value by accessing it in a look-up table, interpolation is a real-time processing activity. Therefore, there are situations in which the speed of interpolation is a limiting factor on the speed of response of the system to an input. It is desirable to be able to reduce the processing time taken by interpolation in order to increase the responsiveness of the drive.

SUMMARY OF THE INVENTION

A method of interpolation according to an embodiment of the invention makes use of a small number of registers to interpolate between stored values in an addressable memory device to produce a target parameter value. After the closest memory location addresses adjacent a target parameter value are located, the two adjacent parameter values are loaded into first and second shift registers. The difference between the values is then generated and loaded into a further register. The difference value is then multiplied by a gradient value which produces a proportional value which is loaded into the second shift register and added to the contents of the first shift register to produce the required target parameter value. By the method, a reduced amount of program code is needed and the memory space required is minimized by shifting values in the registers and overwriting redundant data. A switched reluctance drive system incorporating such a method provides similar advantages.

BRIEF DESCRIPTION OF THE DRAWINGS

The invention can be put into practice in various ways some of which will now be described by way of example with reference to the accompanying drawings in which.

DETAILED DESCRIPTION OF PREFERRED EMBODIMENTS

Figure 1:
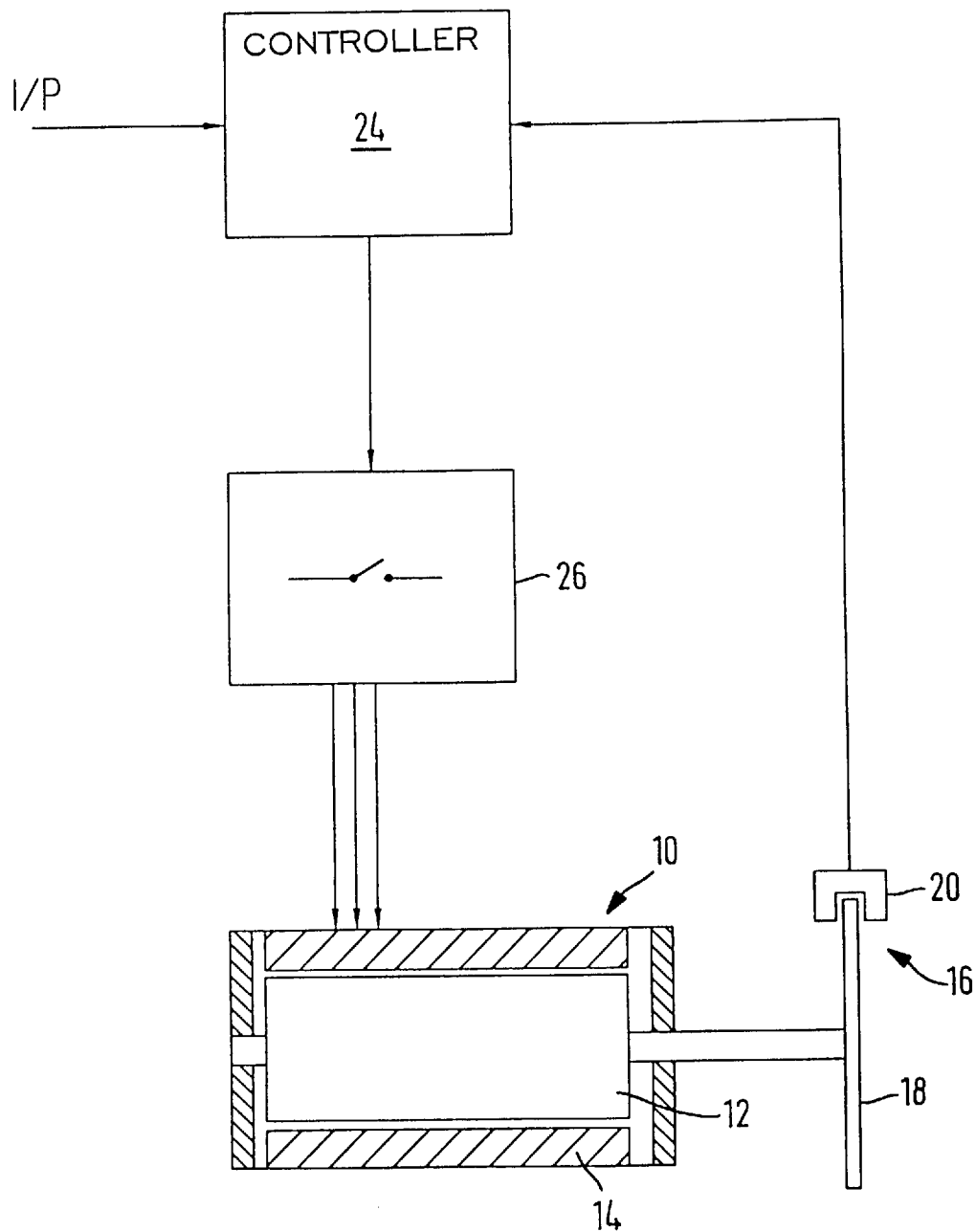
FIG. 1 is a schematic block diagram of a switched reluctance drive system incorporating an embodiment of the invention.

FIG. 1 illustrates a switched reluctance drive system comprising a switched reluctance motor 10, having a rotor 12 and a stator 14. A rotor position transducer (RPT) 16 has an encoded disc 18 mounted on the rotor shaft and a fixed single sensor 20. The output of the sensor 20 can be arranged to derive rotor position information in accordance with the movement of the disc 18 as disclosed in EP-A-0630097, for example, which is incorporated herein by reference. A controller 24 has a user demand input 22 in the form of either a motor speed and/or a torque demand. The motor 10 is a 3-phase machine according to this embodiment, therefore the controller generates 6 firing signals for 6 power switches 26.

In this embodiment the controller is based on an ASIC and controls the 3-phase motor 10 with the single sensor RPT output. Table 1 is a list of the pin descriptions for the ASIC.

TABLE 1

ASIC Pin Description

| Pin number | Description |
| --- | --- |
| 1 | VCC1 - Analog supply +5V |
| 2 | VCC2 - Digital supply +5V |
| 3 | RPT - Position sensor signal |
| 4 | DIR - User direction demand |
| 5 | SCK - SPI clock and tacho output |
| 6 | MISO - SPI data in |
| 7 | TEST - Test input |
| 8 | MOSI - SPI data out |
| 9 | XTAL1 - Crystal oscillator |
| 10 | XTAL2 - Crystal oscillator |
| 11 | SS - SPI slave select |
| 12 | USRPWM - User interface PWM output |
| 13 | PWMREF - Chopping current reference |
| 14 | GNDI - Digital supply ground |
| 15 | GND2 - Analog supply ground |
| 16 | USRIN - User analog/digital input |
| 17 | USRCOMP - Interface comparator analog input |
| 18 | COMPREF - Current comparator reference input |
| 19 | CCOMP - C-phase current comparator |
| 20 | C2 - Phase C bottom switch firing signal |
| 21 | C1 - Phase C top switch firing signal |
| 22 | BCOMP - B-phase current comparator |
| 23 | B2 - Phase B bottom switch firing signal |
| 24 | B1 - Phase B top switch firing signal |
| 25 | ACOMP - A-phase current comparator |
| 26 | A2 - Phase A bottom switch firing signal |
| 27 | A1 - Phase A top switch firing signal |
| 28 | UVOLT - Under-voltage analog input |

Figure 2:
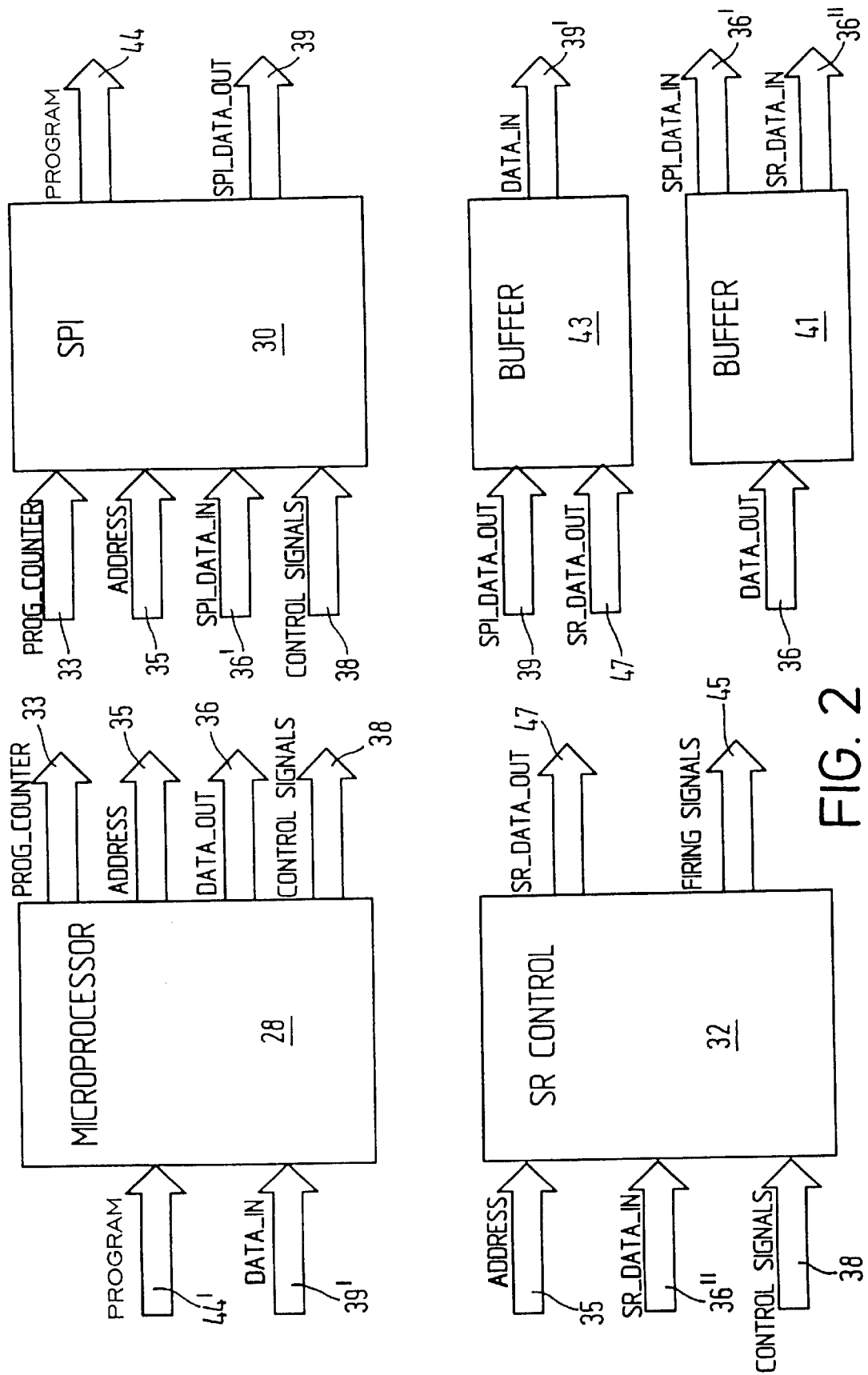
FIG. 2 is a block diagram of the main components of the ASIC of FIG. 1.
Figure 3:
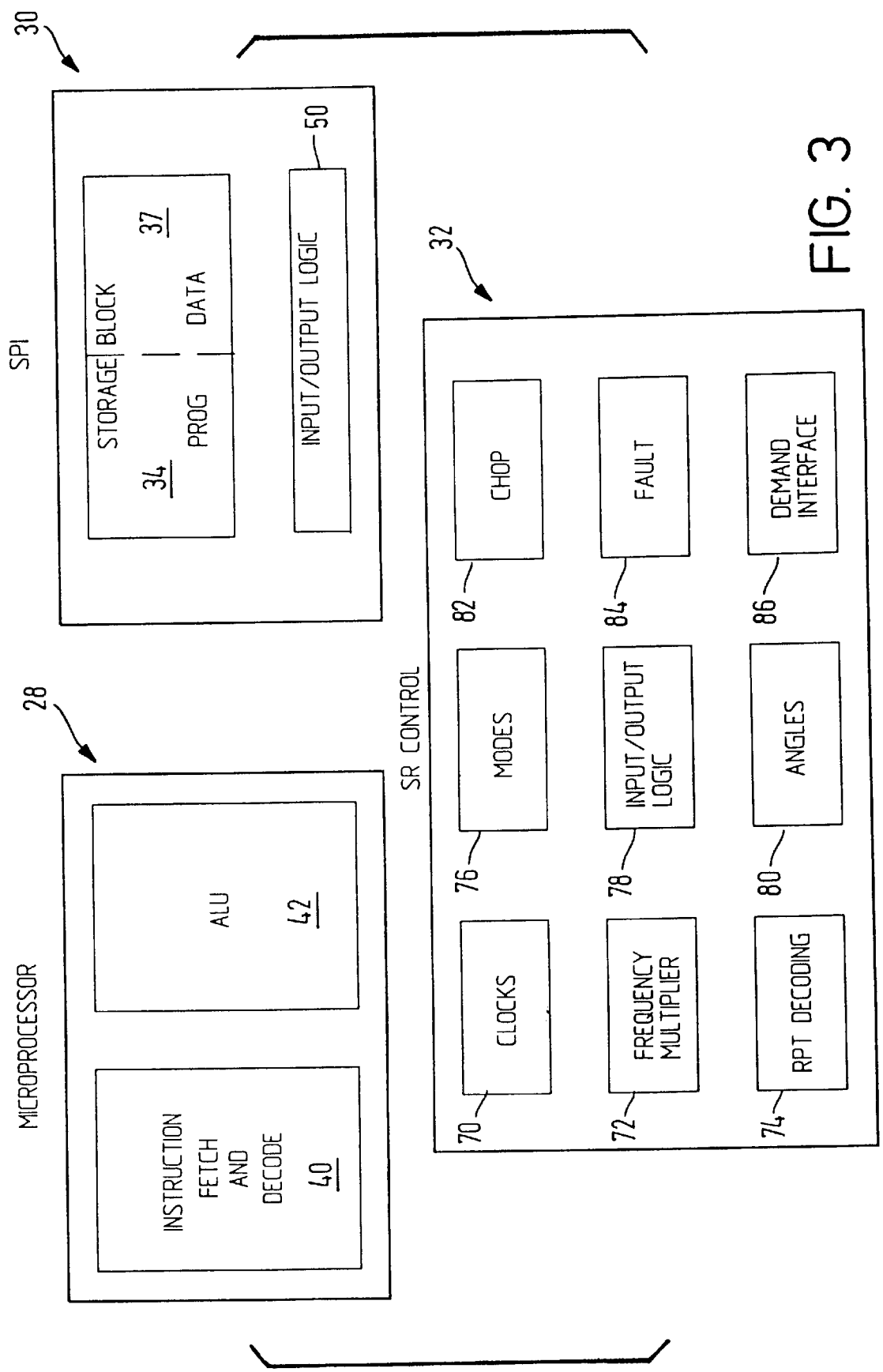
FIG. 3 is a schematic diagram of some of the components of the ASIC illustrated in FIG. 2.

The ASIC may conveniently be divided into three main blocks: the embedded microprocessor 28; the serial-peripheral interface (SPI) 30; and the main SR control 32. Data can be passed between these blocks by means of buffers 41 and 43. A block diagram of these elements of the design is shown in FIG. 2. This figure also shows the main signals which are passed between the blocks. FIG. 3 shows the subdivisions within these main sections.

Figure 4:
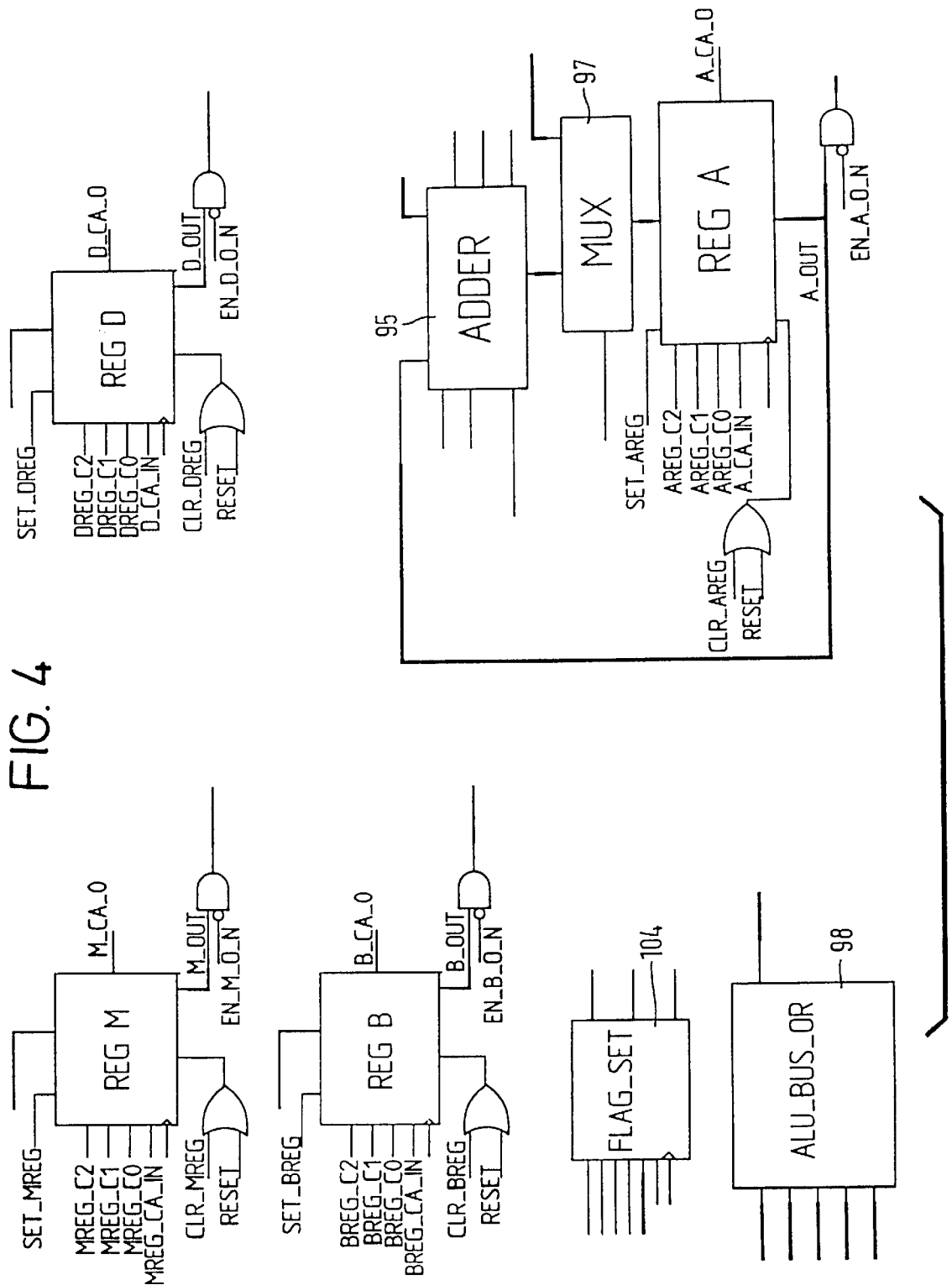
FIG. 4 is a block diagram of the arithmetic logic unit of the ASIC.

The microprocessor 28 generates the program counter 33 which is used to address a program read only memory (ROM) 34 within the SPI 30. It also has an output on an address bus 35 which is used to address both a data ROM 37 in the SPI, and other storage elements (not shown) within the SR control 32. The other two outputs from the microprocessor 28 are on a data bus 36 which is buffered in buffer 41 and used as an input 36' to both the SPI 30 and the SR control 32, and a set of control signals 38 which, with the address bus 35, determine the destination of a given piece of data. Within the microprocessor 28 there are two main sections: an instruction fetch and decode section 40 and an arithmetic logic unit (ALU) 42, as shown in FIG. 3. The decode section 40 generates the program counter 33 and "fetches" the instruction code and any associated data from the program ROM 34. It then uses combinational logic to decode the instructions as will be understood by the skilled person. In decoding the instructions, control signals are generated and passed to the ALU 42, which contains four registers A, B, D and M, as shown in FIG. 4. The registers A, B, D, M are manipulated according to the control signals from the decode section 40.

The program ROM 34 in the SPI 30 is addressed by the program counter 33, generated by the microprocessor 28. The SPI 30 then outputs the program data on bus 44 which is then taken as an input bus 44' to the microprocessor 28. The data ROM 37 is addressed by a combination of the address bus 35 and the microprocessor-generated control signals 38. The data on bus 39 which is extracted from the data ROM 37 is buffered, along with the data output 47 of the SR control 32, to form a data input to the microprocessor.

There are two sections within the SPI 30: the storage area which contains the program and data ROMs 34 and 37 along with the circuitry required to address them; and input/output (I/O) logic 50 which allows data input to the ASIC through to a master-in-slave-out (MISO) pin, and data output through a master-out-slave-in (MOSI) pin (see Table 1). These pins may also be addressed by the microprocessor 28 using the address bus 35 and control signals 38. Data to be output from the ASIC is supplied from the microprocessor data-out bus 36 through buffer 41 to the SPI-data-in bus 36'. Similarly, data which is input to the ASIC is received by the microprocessor 28 on the microprocessor data-in bus 39' via a buffer 43 and the SPI-data-out bus 39.

The SR control 32 receives address and control signals 35 and 38, and the data input 36' which is buffered from data-out bus 36 of the microprocessor 28. The SR control 32 generates the output on the SR-data-out bus 47, which is buffered onto the microprocessor data-in bus 39', and the firing signals 45 for the six power switches which connect the SR machine to the supply. FIG. 3 shows the SR control 32 subdivided into the following 9 sections:

1. Clocks 70—One system-clock signal is input to the ASIC from a crystal oscillator (not shown). Subdivisions of this clock frequency which are required within the ASIC are generated within this block.

2. Frequency multiplier 72—In order to start the motor using the single-sensor coded-disc RPT 16, the rotor position must be known. To achieve this a "lock" routine is used which puts the rotor in a known position when the drive is initially started. To lock the rotor, two phases of the machine are energized for a predefined time period. One of these phases is then switched off so that the rotor is pulled into the position in which it is aligned with the energized phase. An example of this is described in EP-A-0630097. The circuitry to achieve the timing for this routine is included in this section, as is that for a period measurement. The period is read into the microprocessor so that the speed of the motor may be calculated for use in the control loop and/or in the interpolation routine.

3. RPT decoding 74—The sequence generated by the RPT 16 is tested for errors and used to determine the active period of each phase of the motor as is described in EP-A-0630097.

4. Modes 76—The mode of operation of the motor is determined by the microprocessor, according to the speed at which the motor is operating. This will be a choice between chopping, single-pulse and continuous current modes, as described in EP-A-0534761, for example, which is incorporated herein by reference. The mode determines the time for which each phase of the motor may be active, i.e. the time during which the phase winding is connected to the supply. The switching strategy which is to be used is also written from the microprocessor 28 and stored in this block.

5. Input-output logic 78—This section includes the storage of values which are written by the microprocessor 28 to the SR control 32, and also the buffering of output signals onto the SR-data-out bus 47.

6. Angles 80—When the motor is running at relatively high speeds it is operated in the known single-pulse control mode. The microprocessor interpolates the data tables to determine the angles at which the phases should turn on and off according to the speed of, and the load on, the motor. These values are written to the SR control 32 and stored within the Angles block 80. They are used to define the active times of the three phases.

7. Chop 82—The switching strategy which is stored in the Modes block 76 is used to determine the firing signals for the power devices in the Chop block 82. The active period is either that determined by the RPT decoding block 74 at low speeds or the output of the Angles block 80 at higher speeds. The Chop block 82 generates the correct switch control signals for the strategy and mode and also implements any noise-reduction technique such as ramping down the current at the end of the active period according to, e.g. the technique disclosed in U.S. Pat. No. 5,461,295, which is incorporated herein by reference.

8. Fault 84—The firing signals generated in the chop mode are inputs to fault logic. This fault block 84 implements drive protection, such as disabling firing when an under-voltage condition is detected on the main supply to the drive.

9. Demand interface 86—The "user" of this drive has a single demand input 22 to control (see FIG. 1). This input may be an analog or a digital signal and may be used as a torque, speed or chopping level demand, depending on the control strategy which is being implemented. A PWM or analog demand signal is applied to one input of a comparator where it is compared with an appropriate reference input signal. The output of the comparator is converted into a numerical value of the error of the demand relative to the reference by an interface unit.

Referring to FIG. 3, processing within the ASIC is performed by the microprocessor 28. This microprocessor 28 has the four general-purpose registers A B D and M, contained in the ALU block 42, which may be operated on by the instruction set given in Table 2. The ASIC preferably has 8-bit memory addressing. The memory map is defined, for example, in Table 3. The microprocessor 28 also has an 8-bit index register, contained in block 40, which may be used for indirect loading and storing of the general-purpose registers, and an 11-bit start-address register which holds the start-address of the main program code, allowing the use of code which runs only when the device is initialized.

TABLE 2

Microprocessor Instruction Set

| Instruction | Description | Instruction Code (HEX) |
|---|---|---|
| ADC | Add with Carry | 40–4F |
| ADS | Add with Saturation | 60–6F |
| CLC | Clear Carry | 1B |
| DEC | Decrement the Index Register | F4 |
| DIV | Divide | B0–BF |
| HALT | Stop Program Execution | FF |
| INC | Increment the Index Register | F3 |
| JMP | Jump | F1 AND F5 |

TABLE 2-continued

Microprocessor Instruction Set

| Instruction | Description | Instruction Code (HEX) |
|---|---|---|
| JMPC | Jump on Condition | 20–2F |
| JSR | Jump to Subroutine | F2 AND F6 |
| JSRC | Jump to Subroutine on Condition | 30–3F |
| LDD | Load | 04–0F |
| LDDI | Load Indirect | 9C–9F |
| LIM | Limit | C4–CF |
| MUL | Multiply | A0–AF |
| NOP | No Operation | 00 |
| RTS | Return from Subroutine | F0 |
| SBC | Subtract with Carry | 50–5F |
| SBS | Subtract with Saturation | 70–7F |
| SEC | Set Carry | 1F |
| SHIFT | Rotate, Arithmetic & Logic Shifts | 80–8B (RIGHT), 90–9B (LEFT) |
| SHIFT-N | Shift by N-bits | D0–DB |
| STR | Store | 14–17 |
| STRI | Store Indirect | DC–DF |
| STRL | Store on Limit | 10–13 |
| TJMP | Jump on Test Condition | F8 AND FC |
| TRD2 | One-dimensional Table Read | 8D |
| TRD3 | Two-dimensional Table Read | 8E |
| TSC | Table Scan | 8C |
| TXR | Transfer Register | E0–FF |

TABLE 3

ASIC Memory Map

| Address (HEX) | MEMORY USE |
|---|---|
| 00–1F | MICRO SCRATCH PAD RAM |
| 30 | INDEX REGISTER |
| 31 | START ADDRESS REGISTER |
| 40–4F | 8-BIT SR DATA (LATCHED) |
| 50–5F | 16-BIT SR DATA (LATCHED) |
| 60–FF | 8-BIT CONTROL PARAMETER DATA IN ROM |

TABLE 4

ROM Addressing

| ADDRESS (HEX) | DATA |
|---|---|
| 60–67 | TORQUE |
| 68–6F | SPEED |
| 70–77 | OFF |
| 78–7F | FW |
| 80–BF | ON |
| C0–FF | CHOP |

Figure 5:
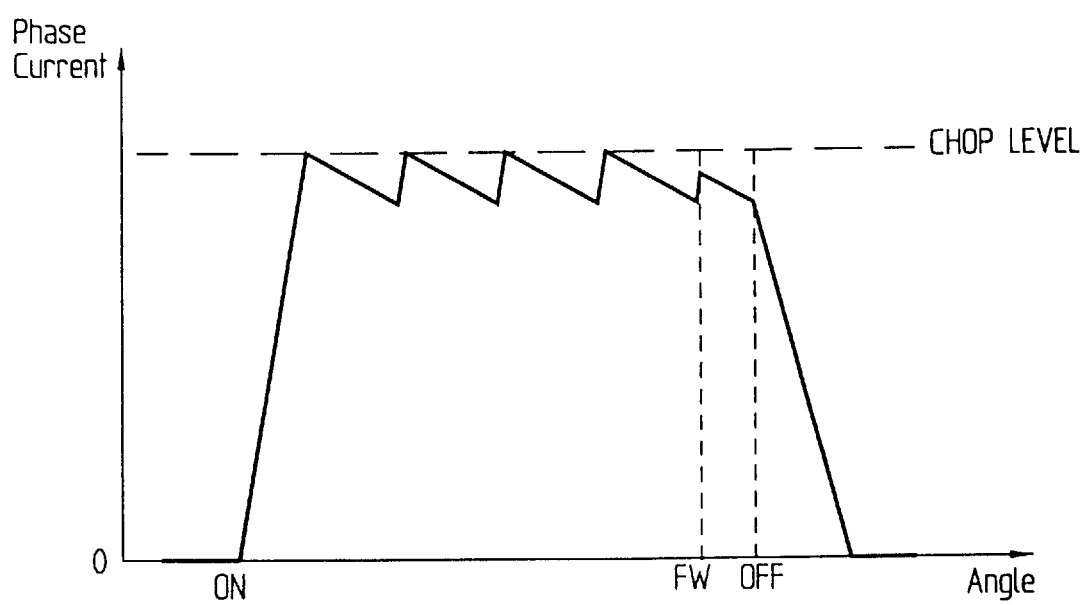
FIG. 5 is a graph illustrating chopping current control in a switched reluctance machine.

As will be appreciated, the timing of the power-device switching must be synchronized with the rotor position. The switching of the devices is determined by the four parameters, ON angle, OFF angle, free wheel (FW) angle and the chopping level. These are shown in FIG. 5 of the drawings. They are more fully described in the PCIM '93 article referred to above.

When the phase switches are ON, both are closed to conduct so that the supply voltage is applied across the phase winding. Conversely, the switches are turned OFF when the two switches are opened. A freewheel condition is put into effect by closing one switch and opening the other, so that the current in the inductive phase winding recirculates and decays more gradually than when both switches are OFF. The chop level is set according to a required output and is the upper threshold at which the winding current is maintained in chop control.

The control parameters ON, OFF and FW and the chop level are stored in the ASIC in sparse matrices in the data ROM 37, along with the torque levels and speeds at which they have been measured. The parameters are addressed as 60 to FF hexadecimal (hex), where the addressed matrix ROM contents are as shown in Table 4. Typically, the stored values in each matrix are determined empirically by running the motor at predetermined speeds and loads to build up the relevant data. A sparse matrix can be an uneven form of matrix in which the values are clustered around the most common operating conditions. Thus, values are often concentrated in the usual operating areas and are increasingly sparse in other areas. Nevertheless, in areas of dense, as well as less dense values, interpolation between values will be needed to enhance the accuracy with which the system responds to an input.

As indicated in Table 4, the values of torque and speed for which measured data have been obtained are stored in two contiguous sequences of memory locations which may be thought of as two rows. In this implementation, OFF angle and FW angle are taken to vary only with speed and to be independent of torque. This allows the values for each of these control parameters to be stored in a single row. By contrast, ON angle and CHOP level are taken to vary with both speed and torque. It follows that storage for these control parameters will require as many rows as there are values of torque.

In this implementation, eight values of speed and eight values of torque are used and each data value is held as an 8-bit number. It will be apparent to the skilled person that other combinations of numbers of data points could be used, e.g. OFF angle could vary with both speed and torque.

Figure 6:
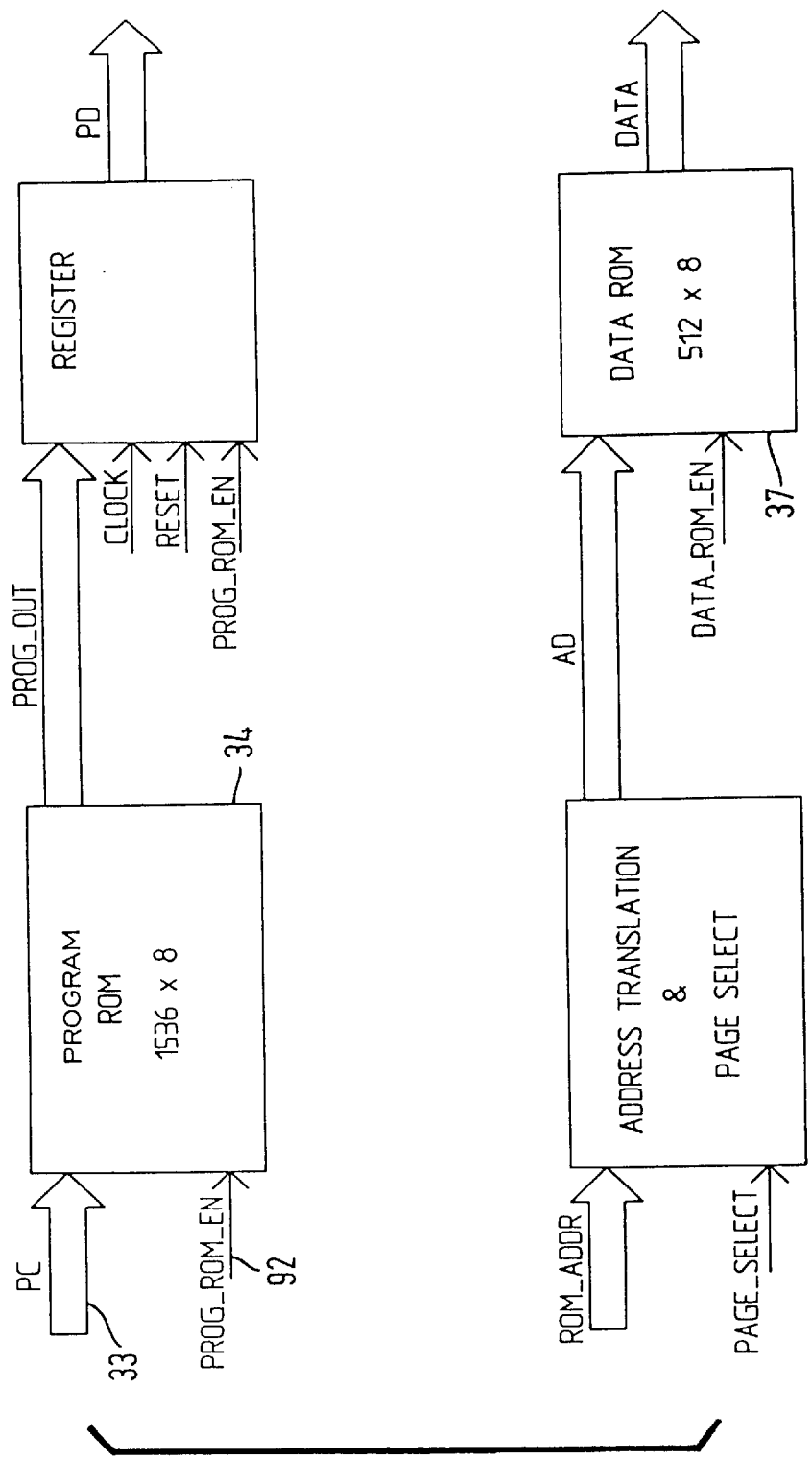
FIG. 6 is a block diagram of the storage elements of the ASIC of FIG. 2.

Within the SPI 30 there is a sub-level "storage" which contains both the program ROM 34 and the data ROM 37. FIG. 6 shows a block diagram of the storage level of the SPI 30. The program ROM 34 is addressed from the microprocessor 28 by the 11-bit program counter 33. Its output is latched when a program ROM enable signal 92 is high. The data ROM 37 is addressed by the microprocessor 28 via the 8-bit ROM address bus. Although it is addressed by the microprocessor as 60-FF hex, the data ROM 37 itself has two sets of tables which are addressed as 00-9F and A0-FF. A page select system is used to translate the address from the microprocessor 28 into an appropriate form for the data ROM.

The microprocessor registers A, B, M and D in FIG. 4 each have three control lines C0, C1, C2, the functions of which are given in Table 5.

TABLE 5

| The Function of the Register Control Lines | | | |
|---|---|---|---|
| C2 | C1 | C0 | REGISTER ACTION |
| 0 | 0 | 0 | DO NOTHING |
| 0 | 0 | 1 | LOAD BUS INTO REGISTER |
| 0 | 1 | 0 | ROTATE RIGHT |
| 0 | 1 | 1 | ROTATE LEFT |
| 1 | 0 | 0 | LOGIC SHIFT RIGHT |
| 1 | 0 | 1 | LOGIC SHIFT LEFT |
| 1 | 1 | 0 | ARITHMETIC SHIFT RIGHT |
| 1 | 1 | 1 | ARITHMETIC SHIFT LEFT |

The registers also have individual SET and clear (CLR) lines as well as carry in (CAIN) and out (CAO) signals. The 16-bit outputs of the registers (OUT) are enabled onto the main ALU bus 36 using active-low signals ENAON, ENBON, ENDON, ENMON through a 5-input, 16-bit OR gate 98. A 16-bit adder 95 is connected to register A through a 2-input, 16-bit multiplexer 97. The block FLAG-SET 104 sets overflow, zero, and negative flags.

Figure 7:
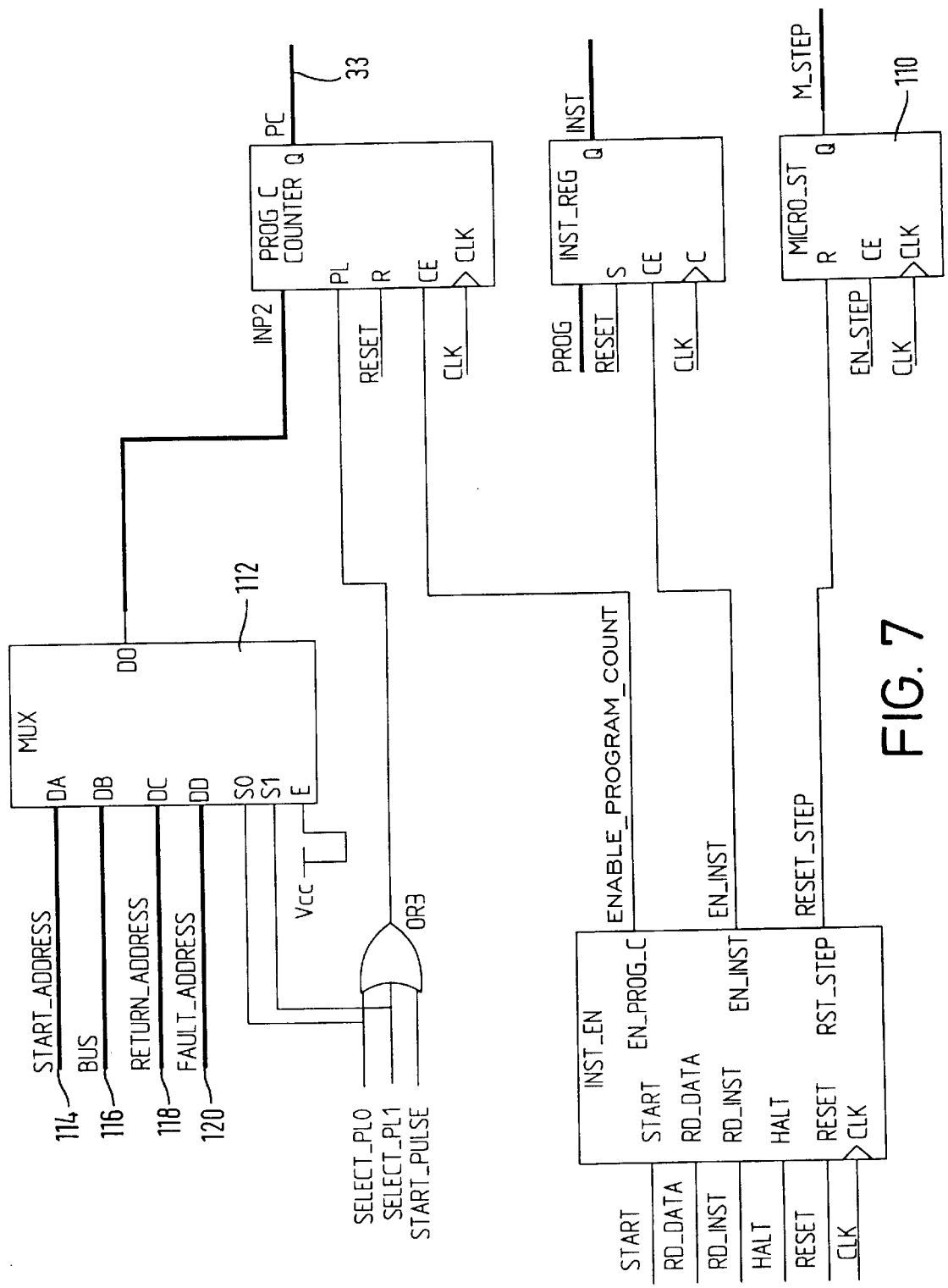
FIG. 7 is a block diagram of the fetch elements of the ASIC of FIG. 2.

FIG. 7 is a block diagram of the detail of part of the decode block 40 and shows the means by which the instructions are fetched from the program ROM 34 shown in FIG. 3. The program ROM 34 is addressed by the program counter 33. Within the block 40 the instructions are timed using micro-steps which are generated from a 7-bit m-step counter 110 shown in FIG. 7. The counter is reset to 0 before each instruction starts and the active signals, during the implementation of the instruction, are timed according to their step location.

The program counter may be loaded using the parallel load (PL) input. The source of the program counter input is a 4-way multiplexer 112, the inputs of which are:

Program start address 114—start of the main code loop.

Bus 116—if a jump instruction is implemented, the value of the jump destination is written to the program counter via the main data bus.

Return address 118—if a subroutine is used in the program then the point to which the program counter must return is loaded via the return address bus.

Fault address 120—if a fault condition occurs in which the fourth input to the multiplexer is selected, zero is loaded into the program counter.

The signals which are used to select the multiplexer inputs, and to parallel-load the program counter, are generated by particular instructions, such as the jump and jump-to-subroutine instructions.

In order to determine the correct control parameters at a given operating point of torque and speed, the microprocessor has to interpolate between the known, stored values. To achieve this, three instructions are designed to scan and read the tables, allowing interpolation of the parameters with a minimum of additional code required.

This embodiment of the invention is concerned with the interpolation between values in the matrix of stored parameter values. It is desirable in high volume production to be able to use a cost-effective controller. Thus, the ASIC should be designed to be as low in cost as possible. Cost savings can be realized by minimizing, as far as possible, the amount of data storage space required for the program code and for temporary stores for data manipulation, such as interpolation.

The conflicting requirements in a motor controller are for speed of response and the space taken by (and cost of) the controller components. On the one hand, a look-up table containing a comprehensive range of parameter values can be accessed in real-time relatively quickly as no computation involving the stored parameters need be carried out. However to do this requires costly and space-consuming memory. Thus on the other hand, a sparse matrix requiring interpolation between stored parameter values requires real-time computation and auxiliary devices for manipulating the data. The invention, in one form, seeks to use a sparse matrix while minimizing the extent to which auxiliary devices are required in the manipulation of the data and the processing time required. This can be done by reducing, where possible, the program code in conjunction with the sparse matrix to reduce the execution time for the interpolation routine. According to the invention the requirement for temporary storage in memory and additional registers in the execution of the routine can be reduced.

Interpolation of a 1-dimensional Table

Figure 8:
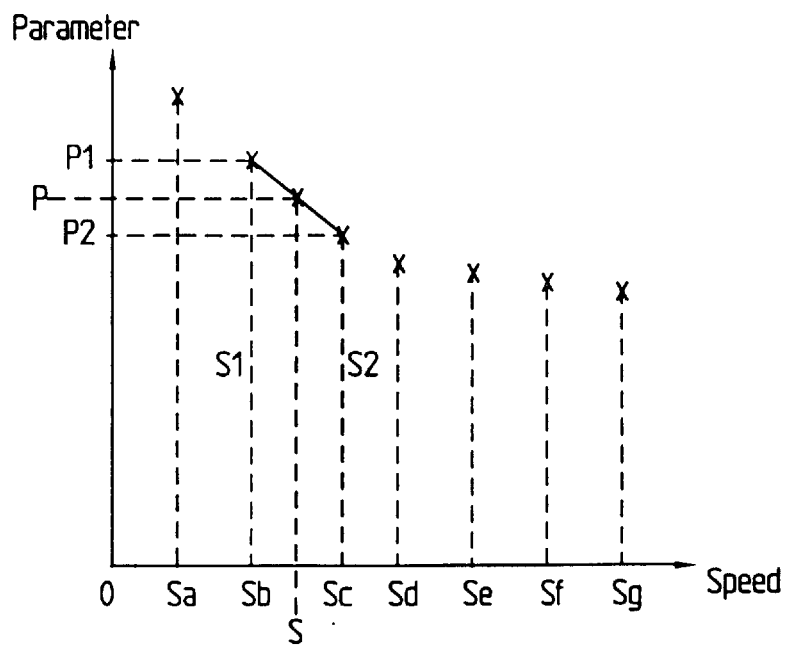
FIG. 8 is a graphical illustration of a one-dimensional sparse matrix of parameter values addressed according to speed values.

As previously explained, the values of the OFF and FW angles are stored in rows in the ASIC as a function of speed. FIG. 8 shows an example of parameter variation with speed. If the motor is turning at some speed S, the table of speed values is scanned to determine the speeds S1 and S2, which are speeds at which values of the parameter have been obtained and between which the value of S lies. The parameter values P1 and P2 must be extracted from the table so that the interpolation may be implemented according to equation (1):

$$P=P1+\{[(P2-P1)*(S-S1)]/(S2-S1)\} \quad (1A)$$

Where:
S=the current speed value
S1=the lower speed value
S2=the upper speed value
P=the interpolated or target value
P1=the parameter value at the lower speed value, S1
P2=the parameter value at the upper speed value, S2

It will be apparent to the person of ordinary skill in the art that the interpolation according to equation (1A) can equally well be carried out by starting at the upper speed value and its associated parameter value and progressing numerically downwards to the target value. In this case, the equation becomes:

$$P=P2-\{[(P2-P1)*(S2-S)]/(S2-S1)\} \quad (1B)$$

The following is based on equation 1A above, but it applies to equation 1B mutatis mutandis.

Table Scan Instruction (TSC)

The table scan instruction TSC in Table 2 is the first part of a torque/speed interpolation routine which implements equation (1) above. Before the instruction is used, the actual value of speed is loaded into the register A. The table scan instruction must have the start address of the part of the table which holds the speed data specified in the instruction call. This address is preceded by an "&", e.g. TSC &$68 for the table starting at 68 hex, where $ denotes a hex value. This will be equivalent to TSC &104, i.e. a table starting at 104 decimal.

The start address is loaded into an index register located in block 40 to allow indirect addressing of the data ROM 37. Successive values of speed are then compared with the value in register A to determine the two speeds in the table which lie to either side of the register value. This may be explained in terms of the action on each step:

Step 1 Clear the most significant 8 bits (MSB) of the 16-bit bus as the address to be read in is only 8-bits. Enable the program ROM 34 to output the address data.

Step 2 Enable the address data onto the address bus 35. Parallel load the address data into the index register. Clock a 2-bit counter which is to be used for timing information during step 4.

Step 3 Put the index register value onto the ROM address bus 35. Again clock enable the 2-bit counter to ensure that it is in the correct state at the start of step 4.

Step 4 Because it is not known how far through the table the desired values will lie, the step counter is disabled, during step 4, until either the two values have been located or the end of the table has been reached. Therefore, timing during this step is determined from the 2-bit counter which generates three signals, EN0, when both outputs are zero, EN1, when the output is binary 01, and EN2, when the output is binary 10. It is on this last state EN2 (10) that the counter is reset, to prevent the fourth possible state 11 being reached. The three states of the counter are used for each value which is extracted from the table to allow sufficient setup and hold-times for the data ROM addressing.

At the start of step 4, EN2 is active so the data ROM 37 is enabled, putting the first data value onto the bus. The bus value is subtracted from the contents of register A and if the result of this subtraction is positive, i.e. if the data value is less than the actual value, the data value is stored, from the bus, into register D by setting the control lines of register D to 001 binary, as shown in Table 5. The index register is then incremented so that it points to the next data value. The 2-bit counter then resets, returning its output to state EN0. During this state, the step counter remains disabled provided that the result of the last subtraction was positive. No other signals are active during the EN0 period. When EN1 is active, the index register is enabled onto the ROM address bus 35 to set up the address before the data ROM 37 is accessed. This pattern continues until the result of a subtraction is negative or the end of the table is reached. When either of these conditions occurs, the step counter is re-enabled and the instruction moves on to step 5.

Step 5 Because successive values, less than the required one, have been stored in the register D, i.e. when the result of the subtraction was positive during step 4, the lower of the two table points, S1, has already been saved. The value is therefore enabled out of register D and subtracted from the contents of register A. This produces the value S–S1 in register A.

Step 6 The result of the step 5 calculation is enabled out of register A and loaded into register M, ready for the division which is to be carried out after the table scan instruction.

Step 7 The index register was enabled during step 4 to extract from the ROM 37 the value which gave a negative subtraction result, i.e. S2. The address to which the index register is still pointing is now enabled onto the ROM address bus 35.

Step 8 The address from the index register is still asserted onto the ROM address bus 35 and the data ROM 37 is enabled to place the value S2 onto the bus, from which it is taken and loaded into register A.

Step 9 The index register is decremented to point at the lower of the two table values.

Step 10 The address to which the index register now points is enabled onto the ROM address bus 35.

Step 11 The address from the index register is still asserted onto the ROM address bus 35 and the data ROM 37 is enabled to place the value S1 onto the bus, from which it is taken and loaded into register D.

Step 12 The contents of register D is enabled onto the bus 35 and subtracted from the value in register A. The result is loaded into register A.

Step 13 The contents of register A is enabled onto the bus and loaded into register B. Register D is cleared. The 2-bit counter is reset. The signal, which generates the clock enable for the program counter and instruction register and resets the step counter, is asserted.

The table scan instruction has been designed so that at the end of the instruction, the registers hold the correct values to proceed directly with the interpolation calculation. That is, B register holds S2–S1

M register holds S–S1

Since the evaluation of Equation 1 requires the division of M by B, and since the quotient will be less than unity, it is conventional in the art to multiply the dividend (M) by a large constant, say $2^{16}$ before the division is carried out. The effect of this constant is taken into account at a later stage in the calculation. In this embodiment, Register D is cleared (i.e. set to all zeros) and appended to register M, effectively providing multiplication by $2^{16}$ (i.e. 65536). Register B is a 16-bit divisor and MD is a 32-bit dividend. The 32-bit quotient is replaced in MD and register A is used for the intermediate calculations. An example of the code which might be used in the interpolation routine is:

LDD A #$87 ;load A with the target value of ;speed

TSC &$68 ;table scan from the start address of ;the speed data

LDD A &$30 ;load A from the index register with ;the address of S1

SEC ;set the carry prior to a subtraction

SBC #$68 ;subtract the initial table address ;from the address of S1

STR A & TEMP0 ;store the address offset at a ;temporary location for later use

DIV U,UL ;divide M and D by B to give ;65536*(S−S1)/(S2−S1)

STR D &TEMP1 ;store D, the result of the division, ;for later use.

Table 6 is an example of the table on which the instruction could operate:

TABLE 6

| ADDRESS | 68 | 69 | 6A | 6B | 6C | 6D | 6E | 6F |
|---|---|---|---|---|---|---|---|---|
| DATA (HEX) | 0 | 24 | 49 | 6D | 92 | B6 | DB | FF |

Implementing the above instruction steps:

LDD A #$87

TSC &$68 index register holds $68, therefore find value 0 from table;

$87−$0=$87 (positive result) therefore store 0 in register D and increment index register to give $69. This retrieves value $24 from table;

$87−$24=$63 (positive result) therefore store $24 in register D, increment index register to $6A & retrieve $49 from table;

$87−$49=$3E (positive result) therefore store $49 in register D, increment index register to $6B & retrieve $6D from table;

$87−$6D=$1A (positive result) therefore store $6D in register D, increment index register to $6C & retrieve $92 from table;

$87−$92=$FFF5 (negative result) therefore end step 4;

Calculate S−S1=$87−$6D=$1A and store this result in register M;

get value S2 (=$92) from ROM and subtract value S1 (stored in register D) from it i.e. A holds $92−$6D=$25 this result is transferred from register A to register B. Register D is cleared (i.e. set to all zeros).

The register contents at the end of the instruction are therefore:

Register A holds 25, the value which is loaded into register B on step 13

Register B holds 25=S2−S1=92−6D

Register M holds 1A=S−S1=87−6D

Register D holds 0.

One-dimensional Table Read (TRD2)

Referring again to FIG. 8, the address of P1 is calculated from the address of S1 and pre-loaded into register A. This (the address of P1) is enabled onto the bus and parallel loaded into the index register. The address of P1 is determined by taking the known address of S1, subtracting the initial speed table address and adding the resulting offset to the start address of that part of the table in which the parameter values are located.

The one-dimensional table read instruction, TRD2, is used, in conjunction with the table scan, when interpolating data which is dependent on only one variable. Before using the instruction, register A must be loaded with the address of P1. The table read instruction then returns the values of P1 and P2−P1 in registers D and M, respectively, for use in the remaining interpolation calculation. The instruction may be explained in terms of the action on each step:

Step 0 The address value S1, which has been pre-loaded into register A, is enabled onto the bus and parallel loaded into the index register.

Step 1 The address held in the index register is enabled onto the ROM address bus.

Step 2 The address of P1 from the index register is held on the ROM address bus and the corresponding value of P1 is enabled out of the data ROM and loaded into register D. The index register is incremented so that it holds the address of value P2.

Step 3 Do nothing while allowing set up time for the new address.

Step 4 The address P2 held in the index register is enabled onto the ROM address bus.

Step 5 The address from the index register is held on the ROM address bus and the corresponding value of P2 is enabled out of the data ROM and loaded into register A.

Step 6 The value held in register D is enabled onto the bus and subtracted from the contents of register A. The result, P2−P1, is loaded into register A.

Step 7 The contents of register A are enabled onto the bus and loaded into register M. The signal which generates the clock enable for the program counter and instruction register and resets the step counter, is asserted. The next instruction is enabled out of the program ROM.

An example of the code in which the table read instruction could be used is:

LDD A #$70 ;load register A with the start ;address of the off-angle table

CLC ;clear the carry before an addition ;operation

ADC &TEMP2 ;add the speed table offset to ;register A to give the address of P1

TRD2 ;issue table read instruction

STR D &TEMP4 ;store the contents of register D, ;P1, to a temporary location

LDD B &TEMP3 ;load register B with the value ;65536*(S−S1)/(S2−S1) generated from ;a scan of the speed table MUL UL,SL ;multiply unsigned register B ;(65536*(S−S1)/(S2−S1)) by signed ;register M (P2−P1) the result being ;in registers A and D CLC ;clear the carry ADC &TEMP4 ;add the stored value P1 to the top ;16-bits of (P2−P1)*65536*((S−;S1)/(S2−S1))

STR A &OFF ;store the result of the addition to ;a location predefined as the off ;angle store.

Note that discarding the bottom 16-bits of the multiplication result has the effect of dividing by 65536.

Table 7 on which this instruction could be implemented is:

TABLE 7

| ADDRESS | 70 | 71 | 72 | 73 | 74 | 75 | 76 | 77 |
|---|---|---|---|---|---|---|---|---|
| DATA (HEX) | C0 | A0 | A0 | A0 | A0 | 9E | 93 | 8D |

In this example, the address of P1 is taken to be $74. This is enabled onto the bus in step 0 and loaded into the index register.

In step 2 the index register is used to address the data ROM. From address $74 we extract the value $A0 (P1) and this is loaded into register D.

The index register is then incremented to give the address of P2 (i.e. $75).

On step 5, the value P2 is extracted from the data ROM and loaded into register A.

On step 6 the value P1 (in register D) is subtracted from the value in register A (P2) and the result is:

$$P2-P1=\$9E-\$A0=\$FFFE$$

The value is copied into register M on step 7.

From the value calculated from the table scan instruction, and the values at the end of the table read instruction, the required parameter value (P) can be calculated according to equation (1). The register contents at the end of the table read instruction are:

Register A holds FFFE, the value which is loaded into register M on step 7

Register B is unused

Register M holds FFFE=P2−P1=9E−A0

Register D holds A0=P1

The execution of equation (1) then reduces to P=D+M*TEMP3; where TEMP3 holds the result of the table scan instruction.

It will be appreciated that, while the above descriptions of the Table Scan and Table Read instructions have considered that the control parameter was a function of speed alone, the control parameters could equally well have been a function of torque alone.

Interpolation of a 2-dimensional Table

Figure 9:
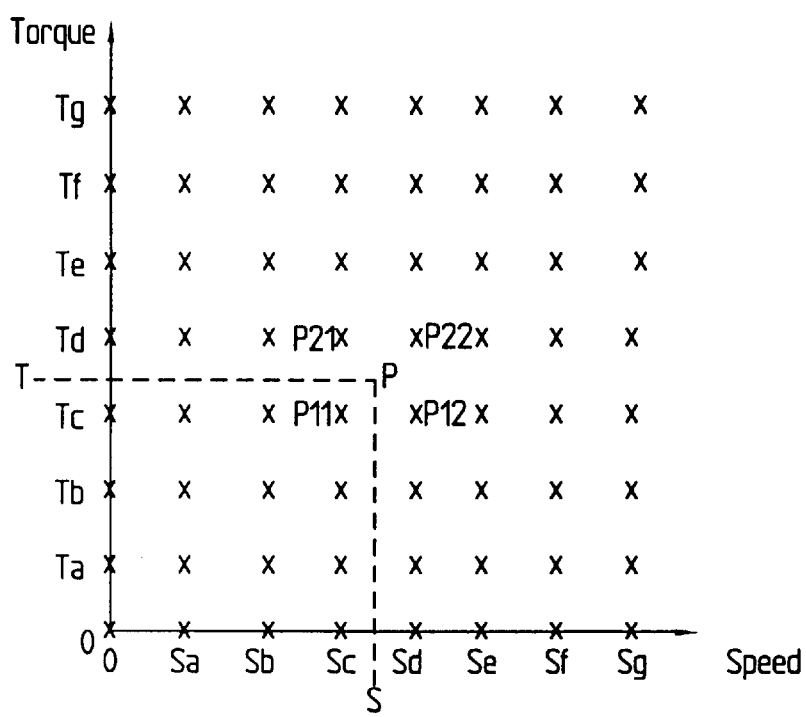
FIG. 9 is a graphical illustration of an irregular two-dimensional sparse matrix of parameter values addressable according to speed and torque.

In this embodiment of the invention, the ON angle and CHOP level are stored as parameters which vary both with speed and with torque. The appropriate table of data must therefore be scanned to determine the values S1 and S2, and T1 and T2, which lie to either side of the measured values of speed, S, and torque, T, respectively. FIG. 9 shows an example of control parameter variation with both torque and speed and the control parameter values, P11, P12, P21 and P22, which must be extracted from the table for the interpolation to be implemented.

When the four parameter values have been extracted from the table, the interpolation is performed using equations (2) to (4):

$$P1=P11+[(P12-P11)*(S-S1)]/(S2-S1) \quad (2)$$

$$P2=P21+[(P22-P21)*(S-S1)]/(S2-S1) \quad (3)$$

$$P=P1+[(P2-P1)*(T-T1)]/(T2-T1) \quad (4)$$

where

P=the interpolated or target value

P1=an interpolated parameter value at the lower torque point

P2=an interpolated parameter value at the upper torque point

P11=the parameter value at the lower speed and lower torque point

P12=the parameter value at the upper speed and lower torque point

P21=the parameter value at the lower speed and upper torque point

P22=the parameter value at the upper speed and upper torque point

S=the actual speed value

S1=the lower speed value in the table

S2=the upper speed value in the table

T=the actual torque value

T1=the lower torque value in the table

T2=the upper torque value in the table

Intermediate values can be interpolated from a two-dimensional table in a similar manner according to the invention still using the four registers for storing the data and the results of the calculations.

Before the two-dimensional table read can be performed, two table scan instructions are required, one on the torque data and one on the speed data.

The two-dimensional table read instruction, TRD3 in Table 2, is used, in conjunction with the table scan TSC, when interpolating the data. Before using the instruction, register A is loaded with the address of P11, the table point which corresponds to the lower values of both torque and speed. The instruction may again be described in terms of the action on each step:

Step 0 Register A, which holds the address of P11, is enabled onto the bus and parallel loaded into the index register.

Step 1 The contents of the index register are enabled onto the ROM address bus.

Step 2 The address from the index register is held on the ROM address bus and the corresponding value, P11, is enabled out of the data ROM and loaded into register D. The index register is incremented to point to P12.

Step 3 Do nothing while allowing set up time for the new address.

Step 4 The contents of the index register is enabled onto the ROM address bus.

Step 5 The address from the index register is held on the ROM address bus and the corresponding value of P12 is enabled out of the data ROM and loaded into register A.

Step 6 The contents of register D is enabled onto the bus and subtracted from the value held in register A. The result of the subtraction, P12−P11, is loaded into register A.

Step 7 The contents of register A are enabled onto the bus and loaded into register M.

Steps 8–14 Increment the index register seven times to point to P21. (The number seven arises because 8 values are stored for each control parameter.)

Step 15 The contents of the index register are enabled onto the ROM address bus.

Step 16 The address from the index register is held on the ROM address bus and the corresponding value P21 is enabled out of the data ROM and loaded into register B. The index register is incremented to point to P22.

Step 17 Do nothing while allowing set up time for the new address.

Step 18 The contents of the index register are enabled onto the ROM address bus.

Step 19 The address from the index register is held on the ROM address bus and the corresponding value P22 is enabled out of the data ROM and loaded into register A.

Step 20 The contents of register B are enabled out onto the bus and subtracted from the value held in register A. The result of the subtraction, P22–P21, is loaded into register A. The signal which generates the clock enable for the program counter and instruction register and resets the step counter, is asserted. The next instruction is enabled out of the program ROM.

TABLE 8

| C0 | C1 | C2 | C3 | C4 | C5 | C6 | C7 |
|----|----|----|------|------|----|----|----|
| C8 | C9 | CA | CB | CC | CD | CE | CF |
| D0 | D1 | D2 | D3$_{P11}$ | D4$_{P12}$ | D5 | D6 | D7 |
| D8 | D9 | DA | DB$_{P21}$ | DC$_{P22}$ | DD | DE | DF |
| E0 | E1 | E2 | E3 | E4 | E5 | E6 | E7 |
| E8 | E9 | EA | EB | EC | ED | EE | EF |
| F0 | F1 | F2 | F3 | F4 | F5 | F6 | F7 |
| F8 | F9 | FA | FB | FC | FD | FE | FF |

Table 8 is an example of an 8-by-8 table starting at address $C0. If P11 is at address $D3, increment the index register once to get to $D4. Steps 8–14 above increment the index register seven times—it goes from $D4 to $DB, i.e. to point at P21. The index register is incremented once more, in step 16, to point to P22, i.e. $DC.

An example of the code in which the table read instruction could be used is:

LDD B &TEMP0 ;load register B with the torque ;table offset

LSLN #$3 ;shift left by three places which is ;equivalent to multiplying by 8

TXR B A ;transfer the contents of register B ;to register A

CLC ;clear the carry prior to an addition

ADC &TEMP2 ;add in the speed table offset to ;give the position of P11 relative to ;the start of the data table STR A &TEMP2 ;store the relative position of P11 ;for future use CLC ;clear the carry ADC #$60 ;add in the start point of the chop ;level data table TRD3 ;issue table read instruction STR D &TEMP4 ;store the contents of register D, ;P11, to a temporary location STR B &TEMP5 ;store the contents of register B, ;P21, to a temporary location STR A &TEMP6 ;store the contents of register A, ;P22-P21, to a temporary location LDD B &TEMP3 ;load register B with the value ;65536*(S–S1)/(S2–S1) generated from ;a scan of the speed table. This ;assumes that two table scan ;instructions have already been ;carried out and the calculations ;done to generate $$;65536 \frac{(S-S1)}{(S2-S1)} \text{ and } 65536 \frac{(T-T1)}{(T2-T1)}$$

;the two values then being stored in ;temporary locations.

MUL UL,SL ;multiply unsigned register B by ;signed register M(P12–P11), the ;result being in registers A and D CLC ;clear the carry ADC &TEMP4 ;add the stored value P11 to the top ;16-bits of (P12–P11)*65536*(S–;S1)/(S2–S1)

STR A &TEMP3 ;store the result of the addition, ;P1, to a temporary location

LDD M &TEMP6 ;load register M with P22–P21

LDD B &TEMP3 ;load register B with the value ;65536*(S–S1)/(S2–S1)

MUL UL,SL ;multiply unsigned register B by ;signed register M, the result being ;in A and D CLC ;clear the carry ADC &TEMP5 ;result of the addition is P2

SEC ;set the carry prior to a subtraction ;instruction

SBC &TEMP3 ;calculate P2–P1

TXR A B ;transfer the contents of register A ;to register B

LDD M &TEMP1 ;load register M with the value ;65536*(T–T1)/(T2–T1) generated from ;scanning the torque table MUL SL,UL ;multiply signed register B (P2–P1), ;by unsigned register M CLC ;clear the carry ADC &TEMP3 ;add P1 to (P2–P1)*65536*(T–T1)/(T2–;T1)

STR A &CHOP ;store the result of the addition to ;a location predefined as the chop ;level store.

Note that discarding the bottom 16-bits of the multiplication result has the effect of dividing by 65535.

The above description concerns interpolation in an irregular sparse matrix in which it is necessary to determine the gradient between stored values, i.e. the rate of change between stored values, at given address ordinates, between which the interpolation is required. The invention can also be implemented in a regular sparse matrix for which the spacing between the ordinates is constant.

Figure 10:
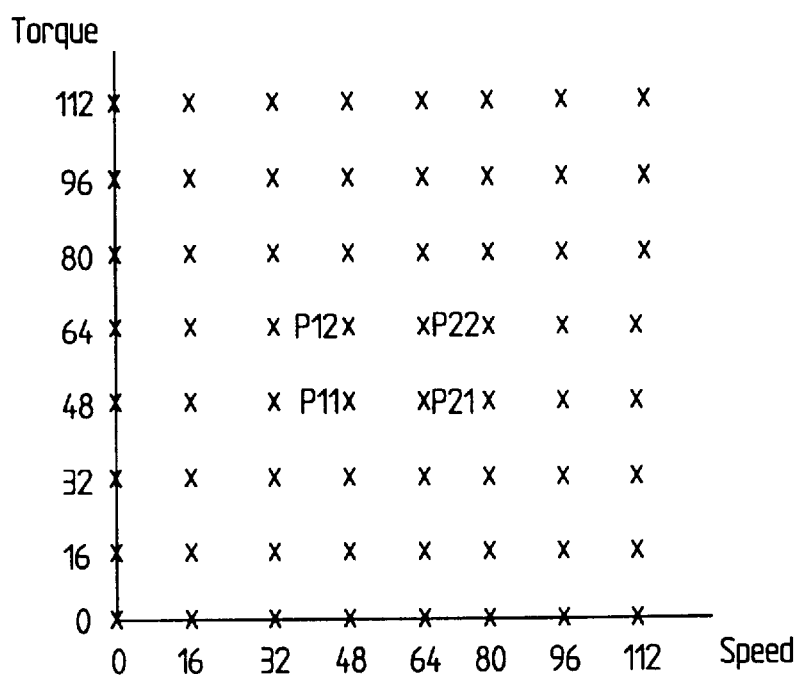
FIG. 10 is a graphical illustration of a regular sparse matrix of parameter values addressable according to speed and torque.

Because the spacing between the ordinates is constant, there is no need for the iterative process described previously and implemented in the Table Scan Instructions. Instead, the ordinate of, say, speed which lies immediately below the specified speed can be identified immediately by simply dividing the specified speed by the spacing between the ordinates. For example, FIG. 10 shows a regular, 2-dimensional matrix which has spacing of 16 between the points at which the speed is stored. If, say, a value of 71 is presented as the speed value for interpolation of the torque, then dividing 71 by 16 gives 4.438. Taking the whole number, 4, indicates that the lower ordinate is the fourth in the table above zero, i.e. 4 times 16=64. This enables the identification of the lower ordinate to be achieved in a single pass through the code for the microprocessor.

Using the nomenclature defined above for the irregular matrix, the process for interpolation of a regular matrix can be illustrated as follows.

A sparse matrix with its addresses is defined as follows: msa15, msa14, msa13, msa12, msa11, msa10, msa09, msa08, P1, P0, S6, S5, S4, T6, T5, T4; where S6,S5,S4 are the 3 MSBs of a 7-bit speed signal and T6,T5,T4 are the 3 MSBs of a 7-bit torque signal. P1 and P0 define the type of parameters stored in the matrix defined, as before, by:

| P1 | P0 | |
|----|----|----|
| 0 | 0 | CHOP |
| 0 | 1 | ON |
| 1 | 0 | FW |
| 1 | 1 | OFF | msa15 . . . msa08 is the address in the data ROM where the data are located.

The equations to solve are:

Let S=S3,S2,S1,S0/((S6,S5,S4+1)−(S6,S5,S4)) =S3,S2, S1,S0/16

Let T=T3,T2,T1,T0/((T6,T5,T4+1)−(T6,T5,T4)) =T3,T2, T1,T0/16

Q=P11+(P21−P11)S.

R=P12+(P22−P12)S.

P=Q+(R−Q)T.

P=P11+(P21−P11)S+TP12+TS(P22−P12)−TP11+TS (P11−P21) =P11+(P21−P11)S+(P12−P11)T+TS(P22+ P11−P12−P21)

Before executing the instruction the following data should have been loaded into the 3 registers as shown:

Register A=0,0,0,0,0,0,0,0,0,S6,S5,S4,S3,S2,S1,S0 (speed).

Register B=0,0,0,0,0,0,0,0,0,T6,T5,T4,T3,T2,T1,T0 (torque).

Register D=msa15,msa14,msa13,msa12,msa11,msa10, msa09, msa08,P1,P0,0,0,0,0,0,0.

Steps 0–3 Logic shift right register A by 4 bits. This discards S3,S2,S1,S0.

Steps 4–7 Logic shift right register B by 4 bits. This discards T3,T2,T1,T0.

Steps 8–10 Logic shift left register A by 3 bits. This puts S6,S5,S4 in the correct location.

Step 11 Add register A to Register B. This generates the 6 LSBs of the address.

Step 12 Add register D to register A. This generates the address of the base point in the table P11.

Step 13 Load the index register with the address of the base point P11.

Step 14 Load the base point of the table, P11 into register D.

Steps 15–22 Increment the index register by 8 so that it points at P21 in the matrix.

Step 23 Load point P21 into register A.

Step 24 Subtract register D from register A and put the result (P21−P11) in register A.

Step 25 Transfer the contents of register A into register B. (P21−P11) to B.

Step 26 Increment the index register by 1 so that it contains the address of point P22.

Step 27 Load point P22 into register A.

Steps 28–35 Decrement the index register by 8 so it contains the address of point P12.

Step 36 Load point P12 into register M.

Step 37 Subtract register M from register A and put the result in register A (P22−P12).

Step 38 Subtract register M from register A and put the result in register A (P22−P12+P11−P21).

Step 39 Transfer the contents of register A into register M (P22−P12+P11−P21).

Step 40 Load point P12 into register A.

Step 41 Subtract register D from register A and put the result in register A (P12−P11).

Step 42 End of instruction.

At the end of the instruction the following partial results have been calculated:

Register A=P12−P11

Register B=P21−P11

Register M=P22−P12+P11−P21

Register D=P11

The result P may now be routinely calculated using existing microprocessor instructions as detailed below:

Assume S*16 is stored at address $S and T*16 is stored at address $T. The maximum value of S and T is 1 and thus they are stored as 16 times their value.

STR A & TEMPO :TEMPO contains P12−P11

STR M & TEMP1 :TEMP1 contains P22−P12+P11−P21

STR D & TEMP2 :TEMP2 contains P11

LDD M & S :M contains S*16

MUL,SL,UL :D contains (P21−P11)S*16

TXR D A :A contains (P21−P11)S*16

RORN #$4 :A contains (P21−P11)S

LDD B &TEMP2 :B contains P11

CLC :Clear carry

ADC B :A contains P11+(P21−P11)S

STR A &TEMP2 :TEMP2 contains P11+(P21−P11)S

LDD B&TEMPO :B contains T*16

LDD M & $T :M contains P12−P11

MUL,SL,UL :D contains (P12−P11)T*16

TXR D A :A contains (P12−P11)T*16

RORN #$4 :A contains (P21−P11)T

LDD B &TEMP2 :B contains P11+(P21−P11)S

CLC :

ADC B :A contains P11)S+(P21−P11)S+(P12−:P11)T

STR A &TEMP2 :TEMP2 contains P11+(P21−P11)S+ (P12−:P11)T

LDD B &S :B contains S*16

LDD M &T :M contains T*16

MUL,UL,UL :D contains S*T*256

TXR D A :A contains S*T*256

RORN #$4 :A contains S*T*16

TXR A M :M contains S*T*16

LDD B &TEMP 1 :B contains P22−P12+P11−P21

MUL,SL,UL :D contains (P22−P12+P11−P21)*S*T*16

TXR D A :A contains (P22−P12+P11−P21)*S*T*16

RORN#$4 :A contains (P22−P12+P11−P21)*S*T

LDD B &TEMP2 :B contains P11+(P21−P11)S+(P12−:P11)T

CLC :

ADC B :A contains P11+(P21−P11)S+(P12−:P11)T+ (P22−P12+P11−P21)ST, i.e. the :required value, P.

The invention thus provides a method of interpolating between parameter values in a sparse matrix that may be regular or irregular. By swapping partial results of the interpolation between registers, minimal use of other storage space is needed. The reduction in storage space is accompanied by a reduced program code. The combination of these two features allows significantly less program memory to be used and the program cycle time to be rapid.

It will be apparent to the skilled person that the invention can be implemented in processing systems other than the ASIC-based SR controller described. Thus, while specific embodiments have been shown by way of example in the drawings and description herein, the present invention is susceptible to various modifications and alternative forms. However, it should be understood that the invention is not intended to be limited to the particular forms disclosed. Rather, the invention is intended to cover all modifications, equivalents and alternatives falling within the spirit and scope of the invention as defined in the appended claims.

What is claimed is:

1. A method of interpolation in a processing system between parameter values to derive a target parameter value, corresponding to an input ordinate, from an addressable memory device containing discrete parameter values at memory locations having at least one-dimensional addresses, the method comprising, for each dimension of address:

determining first and second memory location addresses between the contents of which is the target parameter value;

loading the parameter value held at the first address into a first register;

loading the parameter value held at the second address into a second register;

subtracting the contents of the first register from the contents of the second register to produce a parameter difference;

loading the parameter difference into a third register;

multiplying the contents of the third register by a gradient value to produce a proportional value;

loading the proportional value into the second register; and adding the contents of the first register to the contents of the second register to produce the target parameter value.

2. A method as claimed in claim 1 in which the first and second memory location addresses are determined by:

pointing an index to one memory location in a sequence of memory locations in one part of the memory device holding values of ordinates corresponding to the parameter values held in another part of the device;

loading the input ordinate into the second register;

loading a first ordinate held at the one memory location pointed to by the index into the first register;

comparing the ordinates held in the first and second register;

shifting the index in one direction to point to a next memory location in the sequence if the result of the comparison is not of a predefined character;

repeating the said comparison of the first and second registers after loading the next ordinate held at the next memory location in the sequence into the first register;

adding a predetermined value to the index pointing to the one memory location address of the first ordinate to define the second memory location address in the other part of the device if the result of the comparison is of the predefined character; and shifting the index in the other direction by one address space to define the first memory address in the other part of the device.

3. A method as claimed in claim 2 in which the gradient value is determined by:

loading the ordinate at the one memory location in the sequence into the first register;

loading the ordinate at a previous memory location in the sequence into the second register;

subtracting the contents of the first register from the input ordinate to produce a first ordinate difference;

loading the first ordinate difference into the third register;

subtracting the contents of the first register from the contents of the second register to produce a second ordinate difference;

loading the second ordinate difference into a fourth register;

dividing the contents of the third register by the contents of the fourth register; and storing the result of the division as the gradient value.

4. A method as claimed in claim 1 in which the first and second memory location addresses are determined by:

dividing the input ordinate by the value of a spacing between ordinates, corresponding to adjacent parameter values, to produce a dividend;

discarding the least significant bits of the dividend to leave a value comprising the most significant bits;

shifting an index in one direction by a number of memory location addresses equal to the said value to point to the first memory location address; and shifting the index in the one direction by one memory location address to point to the second memory location address.

5. A method of interpolation in a processing system between parameter values to derive a target parameter value, corresponding to an input ordinate, from an addressable memory device containing discrete parameter values at memory locations having at least one-dimensional addresses, the method comprising, for each dimension of address:

determining first and second memory location addresses between the contents of which is the target parameter value;

loading the parameter value held at the first address into a first register;

loading the parameter value held at the second address into a second register;

subtracting the contents of the first register from the contents of the second register to produce a parameter difference;

loading the parameter difference into a third register;

multiplying the contents of the third register by a gradient value to produce a proportional value;

loading the proportional value into the first register; and subtracting the contents of the first register from the contents of the second register to produce the target parameter value.

6. A method as claimed in claim 5 in which the first and second memory location addresses are determined by:

pointing an index to one memory location in a sequence of memory locations in one part of the memory device holding values of ordinates corresponding to the parameter values held in another part of the device;

loading the input ordinate into the second register;

loading a first ordinate held at the one memory location pointed to by the index into the first register;

comparing the ordinates held in the first and second register;

shifting the index in one direction to point to a next memory location in the sequence if the result of the comparison is not of a predefined character;

repeating the said comparison of the first and second registers after loading the next ordinate held at the next memory location in the sequence into the first register;

adding a predetermined value from the index pointing to the one memory location address of the first ordinate to define the second memory location address in the other part of the device if the result of the comparison is of the predefined character; and shifting the index in the other direction by one address space to define the first memory address in the other part of the device.

7. A method as claimed in claim 6 in which the gradient value is determined by:

loading the ordinate at the one memory location in the sequence into the first register;

loading the ordinate at a previous memory location in the sequence into the second register;

subtracting the contents of the first register from the input ordinate to produce a first ordinate difference;

loading the first ordinate difference into the third register;

subtracting the contents of the first register from the contents of the second register to produce a second ordinate difference;

loading the second ordinate difference into a fourth register;

dividing the contents of the third register by the contents of the fourth register; and storing the result of the division as the gradient value.

8. A method as claimed in claim 5 in which the first and second memory location addresses are determined by:

dividing the input ordinate by the value of a spacing between ordinates, corresponding to adjacent parameter values, to produce a dividend;

discarding the least significant bits of the dividend to leave a value comprising the most significant bits;

shifting an index in one direction by a number of memory location addresses equal to the said value to point to the first memory location address; and shifting the index in the one direction by one memory location address to point to the second memory location address.

9. A switched reluctance drive system comprising a switched reluctance machine and control and power electronics, the control and power electronics comprising a processing system for interpolating between parameter values to derive a target parameter value, corresponding to an input ordinate, from an addressable memory device containing discrete parameter values at memory locations having at least one-dimensional addresses, the processing system comprising, for each dimension of address:

means for determining first and second memory location addresses between the contents of which is the target parameter value;

means for loading the parameter value held at the first address into a first register;

means for loading the parameter value held at the second address into a second register;

means for subtracting the contents of the first register from the contents of the second register to produce a parameter difference;

means for loading the parameter difference into a third register;

means for multiplying the contents of the third register by a gradient value to produce a proportional value;

means for loading the proportional value into the second register; and means for adding the contents of the first register to the contents of the second register to produce the target parameter value.

10. A system as claimed in claim 9, further comprising means for determining the first and second memory location addresses, comprising:

means for pointing an index to one memory location in a sequence of memory locations in one part of the memory device holding values of ordinates corresponding to the parameter values held in another part of the device;

means for loading the input ordinate into the second register;

means for loading a first ordinate held at the one memory location pointed to by the index into the first register;

means for comparing the ordinates held in the first and second register;

means for shifting the index in one direction to point to a next memory location in the sequence if the result of the comparison is not of a predefined character;

means for repeating the said comparison of the first and second registers after loading the next ordinate held at the next memory location in the sequence into the first register;

means for adding a predetermined value to the index pointing to the one memory location address of the first ordinate to define the second memory location address in the other part of the device if the result of the comparison is of the predefined character; and means for shifting the index in the other direction by one address space to define the first memory address in the other part of the device.

11. A system as claimed in claim 10, further comprising means for determining the gradient value, comprising:

means for loading the ordinate at the one memory location in the sequence into the first register;

means for loading the ordinate at a previous memory location in the sequence into the second register;

means for subtracting the contents of the first register from the input ordinate to produce a first ordinate difference;

means for loading the first ordinate difference into the third register;

means for subtracting the contents of the first register from the contents of the second register to produce a second ordinate difference;

means for loading the second ordinate difference into a fourth register;

means for dividing the contents of the third register by the contents of the fourth register; and means for storing the result of the division as the gradient value.

12. A system as claimed in claim 9, further comprising means for determining the first and second memory location addresses, comprising:

means for dividing the input ordinate by the value of a spacing between ordinates, corresponding to adjacent parameter values, to produce a dividend;

means for discarding the least significant bits of the dividend to leave a value comprising the most significant bits;

means for shifting an index in one direction by a number of memory location addresses equal to the said value to point to the first memory location address; and means for shifting the index in the one direction by one memory location address to point to the second memory location address.

13. A switched reluctance drive system comprising a switched reluctance machine and control and power electronics, the control and power electronics comprising a processing system for interpolating between parameter values to derive a target parameter value, corresponding to an input ordinate, from an addressable memory device containing discrete parameter values at memory locations having at least one-dimensional addresses, the processing system comprising, for each dimension of address:

means for determining first and second memory location addresses between the contents of which is the target parameter value;

means for loading the parameter value held at the first address into a first register;

means for loading the parameter value held at the second address into a second register;

means for subtracting the contents of the first register from the contents of the second register to produce a parameter difference;

means for loading the parameter difference into a third register;

means for multiplying the contents of the third register by a gradient value to produce a proportional value;

means for loading the proportional value into the first register; and means for subtracting the contents of the first register from the contents of the second register to produce the target parameter value.

14. A system as claimed in claim 13, further comprising means for determining the first and second memory location addresses, comprising:

means for pointing an index to one memory location in a sequence of memory locations in one part of the memory device holding values of ordinates corresponding to the parameter values held in another part of the device;

means for loading the input ordinate into the second register;

means for loading a first ordinate held at the one memory location pointed to by the index into the first register;

means for comparing the ordinates held in the first and second register;

means for shifting the index in one direction to point to a next memory location in the sequence if the result of the comparison is not of a predefined character;

means for repeating the said comparison of the first and second registers after loading the next ordinate held at the next memory location in the sequence into the first register;

means for adding a predetermined value from the index pointing to the one memory location address of the first ordinate to define the second memory location address in the other part of the device if the result of the comparison is of the predefined character; and means for shifting the index in the other direction by one address space to define the first memory address in the other part of the device.

15. A system as claimed in claim 14, further comprising means for determining the gradient value, comprising:

means for loading the ordinate at the one memory location in the sequence into the first register;

means for loading the ordinate at a previous memory location in the sequence into the second register;

means for subtracting the contents of the first register from the input ordinate to produce a first ordinate difference;

means for loading the first ordinate difference into the third register;

means for subtracting the contents of the first register from the contents of the second register to produce a second ordinate difference;

means for loading the second ordinate difference into a fourth register;

means for dividing the contents of the third register by the contents of the fourth register; and means for storing the result of the division as the gradient value.

16. A system as claimed in claim 13, further comprising means for determining the first and second memory location addresses, comprising:

means for dividing the input ordinate by the value of a spacing between ordinates, corresponding to adjacent parameter values, to produce a dividend;

means for discarding the least significant bits of the dividend to leave a value comprising the most significant bits;

means for shifting an index in one direction by a number of memory location addresses equal to the said value to point to the first memory location address; and means for shifting the index in the one direction by one memory location address to point to the second memory location address.

* * * * *